Jan. 19, 1932.   C. J. WESTLING   1,842,056
VALVE
Filed Jan. 10, 1929   4 Sheets-Sheet 1

Inventor
Carl J. Westling
By Brown, Jackson, Boettcher & Dienner
Attys.

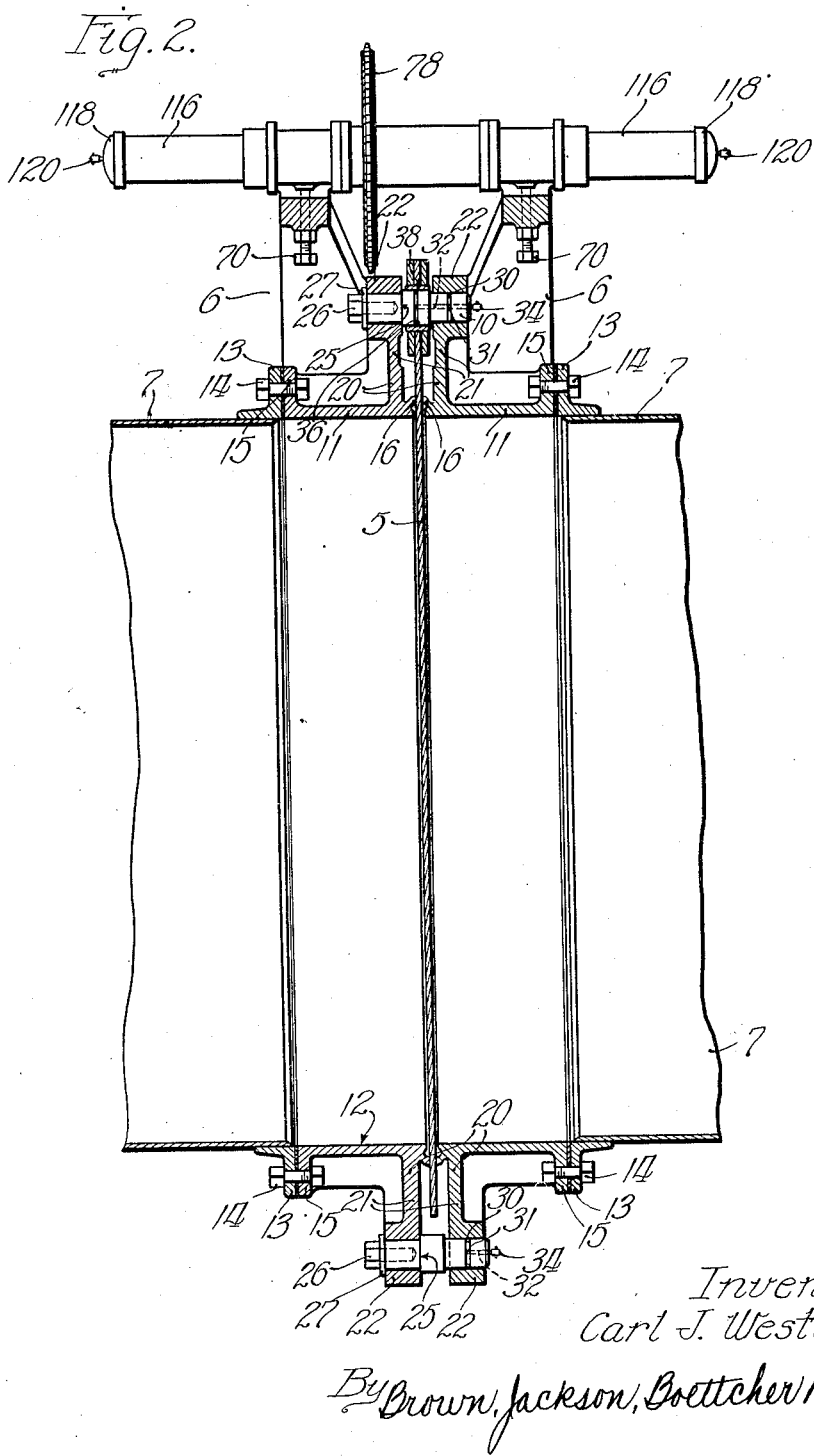

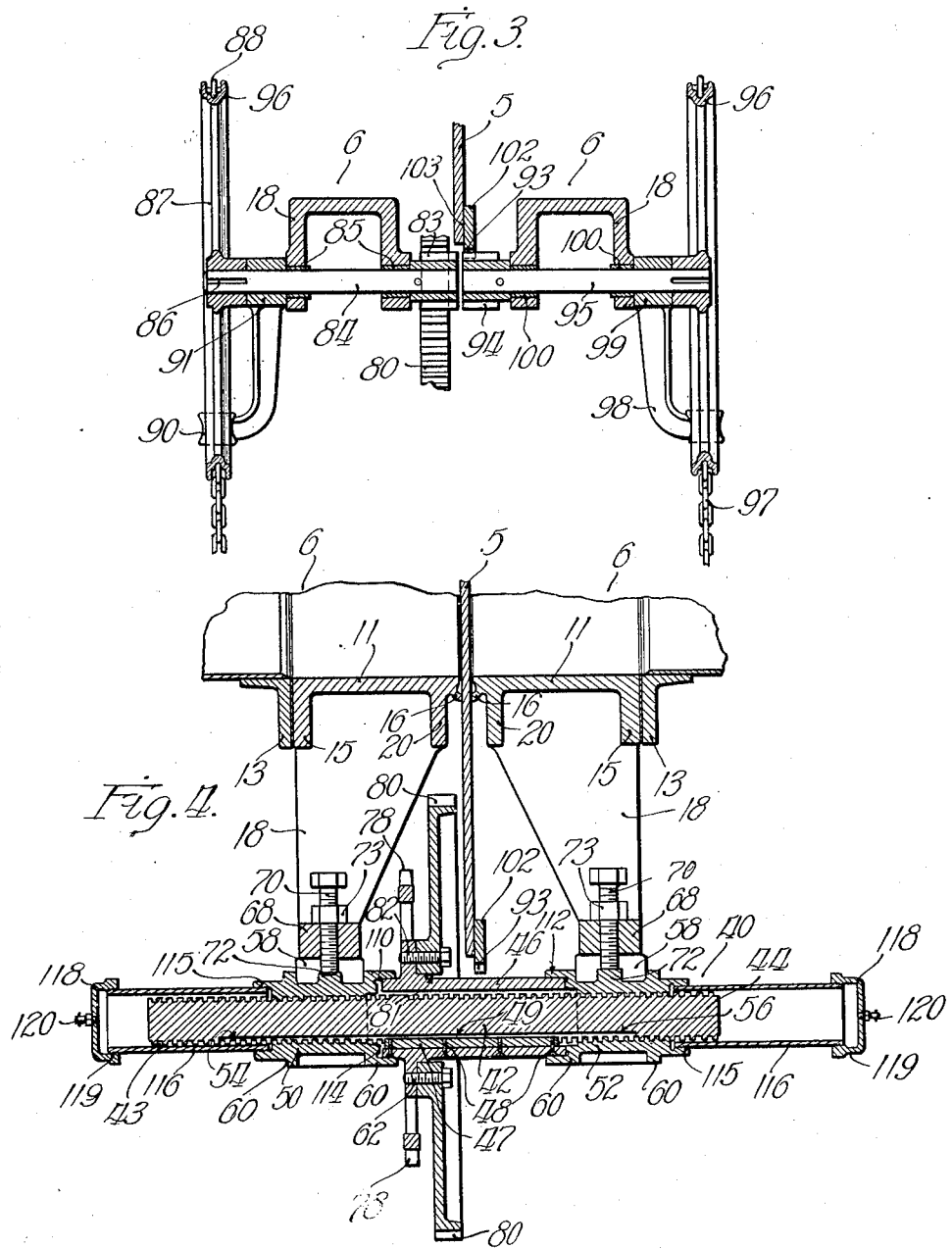

Jan. 19, 1932.  C. J. WESTLING  1,842,056
VALVE
Filed Jan. 10, 1929  4 Sheets-Sheet 4
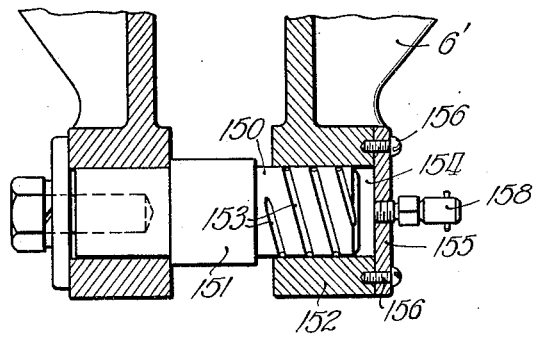
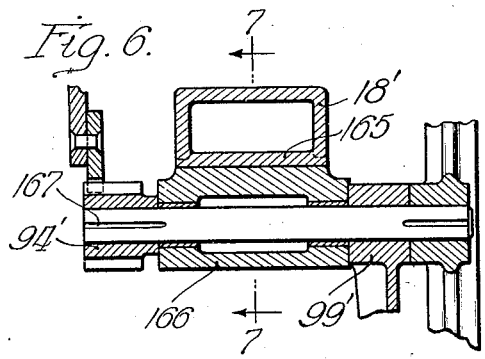
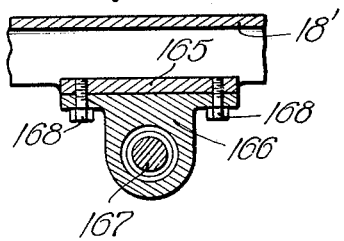
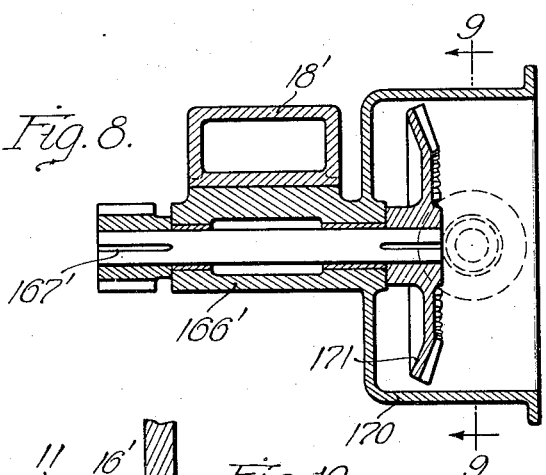
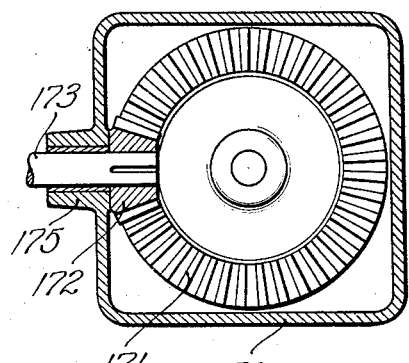
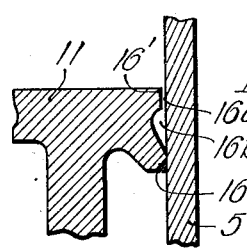
Inventor
Carl J. Westling
By Brown, Jackson, Boettcher & Dienner
Atty's.

Patented Jan. 19, 1932

1,842,056

UNITED STATES PATENT OFFICE

CARL J. WESTLING, OF CHICAGO, ILLINOIS

VALVE

Application filed January 10, 1929. Serial No. 331,641.

This invention relates to valves.

The invention relates more particularly to goggle or spectacle valves for blast furnaces or other gas lines for cutting off the blast or flow of gas therethrough, but may be used for other purposes as suitable or desired.

Gas handling presents many problems well known to those skilled in the art. This is especially true where the gas is very hot, dirty, or noxious. Of all the problems connected with handling large quantities of such gases, one of the greatest is in the valves. To be satisfactory, they must be adaptable to many varied plant conditions and in use they must remain absolutely safe and dependable at all times.

In actual practice, the flow of gas through pipes or mains of this sort may be under relatively great pressure and in my copending application, Serial No. 255,275, filed February 18, 1928, I have provided a generally improved and simplified mechanical contrivance for pressing the pipe ends together or against the valve members with a powerful force or great pressure.

The above application also provides for obtaining this relatively powerful force or great pressure with a relatively slight applied effort, manual or power, and for reducing the time of operation. It also provides an improved pressure frame structure and for obtaining other or additional advantages as set out in or apparent from the above referred to application.

The present invention provides a ratio connection and particularly a reduction ratio connection between the operator and the differential screw or jack units. This connection further increases the ease of operation and the amount of effort necessary for closing the valve frames upon and releasing same from the valve member and permits a further reduction in the size and weight of the parts.

The present invention also provides an improved driving screw assembly and an improved driven screw assembly, together with an improved adjustable mounting for these driving and driven screw assemblies. The connections for dowelling or connecting the pressure frames for maintaining alignment therebetween and permitting longitudinal movement are also improved and the two valve frame structures are or may be exactly alike, which makes for uniformity and decreases the cost. The shafts for the hand chain wheels or other operators are preferably similarly journaled in the pressure frames with one connected to swing the valve plate member and the other having ratio connection with the driving screw assembly.

The valve or pressure frames preferably comprise, as before, triangular ring castings forming beams from point to point of pressure application and thereby uniformly distributing the load or pressure about the ends of the gas main or other line.

The valve member, itself, is preferably of the pivoted cut-off plate type and is preferably pivoted on one of the dowel pin connections between the valve frames, the lengths of which dowel pin connections are materially reduced over anything heretofore provided. The reduction in the lengths of these connecting pins increases the strength and the parts are all so constructed and arranged that the stresses imposed will be transmitted effectively and without any distortion or deflection that would affect the tightness of the valve.

The present invention is illustrated in the accompanying drawings, in which:

Figure 2 is a vertical section, taken substantially on the line 2—2 of Figure 1;

Figure 3 is a fragmentary detail section through the chain wheel or operator shafts, taken on the line 3—3 of Figure 1;

Figure 4 is a fragmentary detailed section through the driving screw or driving jack shaft, taken on the line 4—4 of Figure 1;

Figure 5 is a fragmentary detail section showing another form of dowel pin and lubricator therefor;

Figure 6 is a fragmentary detail section showing another form of support or bearing for the operating shafts;

Figure 7 is a fragmentary cross section, taken on the line 7—7 of Figure 6;

Figure 8 is a section similar to Figure 6, showing another form of bearing and a bevel gear drive for the operating shafts;

Figure 9 is a section taken on the line 9—9 of Figure 8; and

Figure 10 is a fragmentary detail section, showing in detail the annular valve seating lip on the valve frame.

Figure 1:
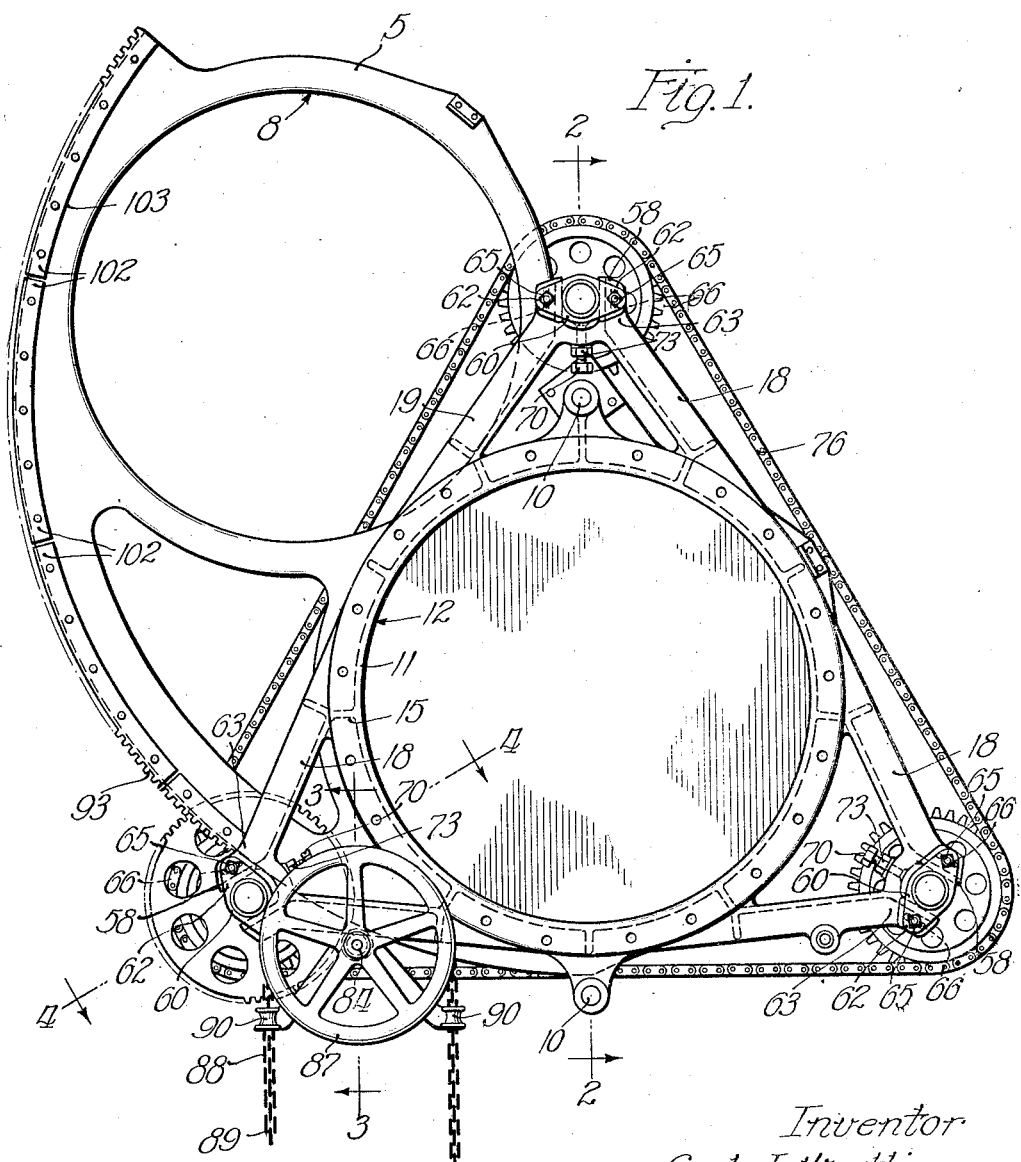
Figure 1 is an elevational view of a valve and valve operating mechanism and mounting embodying the present invention.

Referring to the drawings, the valve mechanism shown comprises a valve plate 5 interposed between two pressure or valve frames 6, 6, which align with and are tightly secured, respectively, to adjoining ends of the pipe sections 7, 7. The valve plate 5 is provided with an opening 8, which may be moved into or out of registration with the bore of the pipe, to open and close the passage through the pipe by swinging said plate 5 about one of the dowel pins 10, which pivotally supports said plate 5 between the valve frames. The pressure or valve frames 6, 6 have integral and inner and centrally disposed ring or collar portions 11, 11, interposed between the ends of the pipe sections 7, 7, and constituting in effect the adjacent pipe ends. Due to the construction of the frames 6, 6, the bores or openings through the collars 11 have the same diameter of opening from end to end as that of the pipe flanges to which the frames 6 are attached. This permits unobstructed flow and eliminates any internal surfaces, pockets, or other obstructions, in or on which dirt or any of the heavier contents of the fluid might collect. The elimination of obstructions also permits flushing out the line and eliminates any possible damming action within the link.

These bores 12 of the collars 11 register with each other and with the bores of the pipe sections 7, the ends of which are suitably flanged at 13 and bolted, or otherwise suitably secured, at 14 to the abutting circular flanges 15 of the collars 11. The valve plate 5 is disposed between the adjacent ends of the collars 11, which ends are preferably thinned to form relatively thin annular lips 16, which are preferably flared outwardly slightly, as shown, and bear firmly and, when the pressure is on, with great force against the opposite faces of the valve plate 5.

The lips 16 are preferably formed as shown on an enlarged scale in Figure 10, being flared outwardly, as shown and internally of these lips are the annular secondary lips 16'. The lips 16' are spaced or free of the valve plate 5 at all times, as indicated at 16$^a$, but overhang the annular pockets 16$^b$ and prevent the entry and accumulation of large particles of dirt and other foreign materials at the sealing lips 16.

The valve frames 6 are, preferably, of the girder type, each preferably consisting of a generally triangular ring casting, the particular configuration of which may, of course, be varied. The particular frames shown have, in addition to their integral hub or ring portions 11, integral tangential bracket arms or beams 18.

The tangential beam extensions 18, as well as the hub portions 11 of the frames 6 may be of channel formation, as shown, and the frames may be suitably strengthened by ribs 19 (Figure 1). The second circular flanges 20 of the valve frames not only provide increased strength, but provide at diametrically opposite points integral extensions 21 on the valve frames for the dowel pins 10.

The outer ends of the dowel pin receiving extensions 21 are, preferably, thickened at 22 to provide suitable bearings for the ends of the pins 10. The opposite ends of each of the two dowel pins 10 are reduced, providing an annular shoulder 25 within the length of each pin and one of the reduced ends of each pin is secured, as by means of a bolt 26 and washer 27, in the integral extensions 21 of one of the valve frames 6. The opposite reduced ends of each pin 10 are slidable in the integral extensions 21 of the other valve plate. The dowel pins 10 connect the frames 6 and hold these frames against relative turning and in proper alignment and, at the same time, permit longitudinal movement between the frames.

The dowel pins 10 are relatively heavy for strength and the permitted disposition of the integral dowel pin receiving extensions 22 of the frame in close proximity permits these pins 10 to be relatively short, which eliminates or minimizes any distortion or deflection at these points, under the relatively great stresses imposed. Each pin 10 is, in Figure 2, provided with an annular peripheral groove 30 where it slidingly bears in the frame member 6 to the right in Figure 2 and these grooves 30 communicate through radial ducts 31 with axial lubricant ducts 32 formed in the pins 10 and supplied with grease or other suitable lubricant, as by means of "Alemite" or other suitable fittings 34.

In addition, the upper pin 10 of the selected illustration, upon which the valve plate 5 is pivoted or swingably mounted, is provided with an annular peripheral groove 35, which similarly communicates with the lubricant duct 32 and supplies lubricant to the swingable bearing of the valve plate 5 upon this pin 10, which swingable bearing is shown as being provided with a suitable bushing 38. Thus, in the illustrated embodiment of this invention, the valve frames 6, which carry the valve member 5 and all operating parts, as will be explained presently, are supported solely upon the ends of the pipe 7 and without any such pedestal or base, as shown in my prior application, but this may, of course, be varied within the scope of certain aspects of the present invention.

In Figure 5, I have shown another form of dowel pin and lubricator therefor. In this case, the end 150 of the pin 151 which slidingly bears in the extension 152 of the frame 6' is provided with a helical peripheral groove 153 and the end of the opening 154, in which the pin slidingly bears, is closed by a cap plate 155, secured to the frame 6' by screws 156. The cap plate 154 is provided with an "Alemite" or other fitting 158, for supplying lubricant to the opening 154 and the helical groove 153, which groove in operation supplies the lubricant uniformly over the entire bearing surface of the pin in the opening 154. Upon movement of the valve frames together, the lubricant is forced through the groove 153 under pressure, which pressure effectively prevents the entry of dust or other foreign matter into the end of the groove which opens to the outside and prevents corrosion along the bearing surfaces and at the end of the pin.

For pressing the pipe ends, that is, the ends 16 of the collars 11, which in effect constitute the pipe ends, tightly against the opposite faces of the valve plate 5 to seal the pipe or main adjacent the plate 5, three differential screws or jack units 40 are provided. Each of these differential screw units 40 consists of a differential screw 42. As already pointed out, there are a plurality of these differential screw units, three in the illustrated embodiment of the invention, although of course, the particular number may vary and these differential screw units 40 are spaced equally distant apart about the collar portions 11 of the valve frames 6, in order to apply the pressure uniformly about the pipe ends.

Each screw 42 (as shown in Figure 4) has an external screw thread 43 on one end, or on one side of its intermediate portion and an external screw thread 44 on its opposite end, or on the opposite sides of the intermediate portion. Each of the screws 43 and 44 may be either a single or double or multiple thread screw, as shown. The screws 43 and 44 are both right hand or both left hand screws, and the threads on one end are of different pitch from the threads of the screw on the other end of the same differential screw 42, so that the rectilinear movement imparted to the frames 6 at opposite sides of the valve plate 5 by these screws 42, as will be described presently, will be in the same direction, but at different speeds. In other words, when these screws are turned, a differential uni-directional rectilinear movement will be imparted to the frames 6 thereby.

For the purpose of rotating or turning the screws 42, a sleeve 46 is splined at 47 on the intermediate portion of each screw 43, as by means of the key or spline 47 secured internally to the sleeve 46, as by means of screws 48 and engaging in a longitudinal key-way or groove 49 in the screw 43. For the purpose of transforming the rotation or turning movement of the screws 42 into rectilinear movement of the frames 6, each of the opposite screw-threaded ends 43 and 44 of each screw is provided with an internally threaded nut or collar 50 at 52, respectively.

The screws 42 are, preferably, of high tensile strength steel and the nuts 50 and 52 are, preferably, of bronze, or other suitable material, although this may vary. The internal threads in the nut 50 conform and have threaded engagement with the screw thread 43, and the internal threads in the nut 52 conform and have threaded engagement with the screw thread 44. The screw threads 43 and 44 are, preferably, of coarse pitch, square thread formation of the same hand, but of slightly different lead cut on each end. The opposite threaded ends of each of the two threaded portions 43 and 44, preferably, have an extension of the groove 49 extending to the internal threads of the nuts 50 and 52, as indicated at 54 and 56, respectively. These groove or key-way extensions are adapted for delivering the oil or other lubricant within the screw enclosures to the screw threads at the opposite ends of the screws 42 and to the cooperating internal screw threads in the nuts 50 and 52.

As already pointed out, the frames 6 are shown as provided with three integral tangentially disposed beams or bracket arms 18, which converge and unite in triangular form, and the nuts 50 and 52 are fitted in forks 58 formed at the apices of the triangular extensions 18 and, preferably, integral therewith. For the purpose of moving the frames 6 rectilinearly, closer together or farther apart, with the differential uni-directional rectilinear movement of the nuts 50 and 52, each nut 50 and 52 is provided with a pair of longitudinally spaced circular flanges 60.

The forked ends 58 of the frames 6 fit snugly between the flanges 60, so that one frame 6 is moved as a unit rectilinearly with the nuts 50 and the other frame 6 is moved as a unit rectilinearly with the other nuts 52.

At diametrically opposite sides, the flanges 60 of each nut are elongated, as indicated at 62 in Figure 1, and these elongated flanged portions 62 fit snugly over the channelled sides 63 of the forks 58 and are secured thereto by bolts 65, at diametrically opposite sides. The openings 66 in the channelled ends or sides 62 of the forks 58 are elongated, as shown in dotted lines in Figure 1. The elongated openings 66 are all disposed parallel adjacent each screw unit and the directions of elongation are disposed to permit adjustment of any one or any combination or all of the screw units radially, with respect to the axis of the collars 11.

For the purpose of adjusting the screw units 40, the base 68 of each fork 58 is provided with a screw 70 threaded therethrough radially with respect to the axis of the collars 11 and having abutting engagement at its outer end with an integral boss or radial protuberance 72 on the adjacent nut 50 or 52, as the case may be. The screws 70 are locked in any desired adjusted position in the bases 68 of the forks 58, as by means of lock nuts 73. From the foregoing, it will now be apparent that, by loosening the bolts 65, any one or any combination, or all of the screw units 40 may be moved radially outwardly by threading the adjusting screws 70 outwardly in the fork bases 68 or, by threading these screws 70 inwardly, any one or any combination or all of the screw units may be moved radially inwardly and the screw units may be secured in any desired adjusted position by again tightening the bolts 65, while the adjusting screws 70 may be locked or secured in adjusted position by drawing up or tightening the lock nut 73 on the adjacent surfaces of the bases 68.

A chain 76 is trained about sprockets 78 on the several screw units and the adjustable mounting of the screw units and adjusting provisions therefore provides for taking up or allowing any desired slack in this connecting chain 76.

The chain 76 is for the purpose of rotating or turning the several sleeves 46 in unison and in the same direction, to similarly and equally rotate the several screws 42. This chain is, preferably, a malleable iron closed pintle or continuous or endless chain, although this may vary. The chain or sprocket wheels 78, over which the endless chain 76 is trained, are shown as being formed integral with the sleeves 46 (Figure 4), but they may, of course, be formed separate and suitably secured thereto.

For the purpose of applying the actuating effort, manual or motor, to the differential screw or jack units 40, one of the sleeves 46 is, preferably, provided with a relatively large driving gear 80. This driving gear 80 is shown in connection with the differential screw unit 40 of Figure 4, this screw unit or assembly thereby constituting the driving screw. The other two screw units 40 are identical with that shown in Figure 4, with the exception that the driving gear 80 is omitted. In the illustrated embodiment of the invention, the gear 80 is made up separate and provided with an axial bore or opening proportioned to fit over the sleeve 46 and the hub portion of the gear 80 surrounding this bore or opening 81 is rigidly secured to the chain wheel or sprocket 78, as by means of screws 82.

The driving gear 80 meshes with a relatively small driving pinion 83 fixed upon the motor or manually driven operator shaft 84 (Figure 3). The shaft 84 is journalled in an integral part of the adjacent beam portion 18 of the adjacent valve frame 6, and the bearing of this shaft in this beam portion 18 may be provided with suitable bushings 85. Fixed at 86 upon the outer end of the shaft 84 to turn said shaft 84 therewith is a chain wheel or sprocket sheave 87 and this wheel or sprocket 87 is provided with a crane or other suitable chain 88, which chain 88 is trained over the wheel 87 and looped down at 89 to be conveniently accessible to the attendant for manual manipulation from the floor or a platform adjacent the valve. The chain 88 is guided downwardly at opposite sides by guides 90 radiating and integral with a common hub portion 91 mounted upon the shaft 84 as, for example, between the beam portion 18 and the wheel 87. Of course, instead of a chain 88, any other suitable flexible element for manually turning the shaft 84 may be employed. Motor units may be installed for driving the shaft 84 and these may be wired for remote control. The valve operating mechanism is designed for complete interlocked motor operation and the motor units can be furnished ready for attachment to the valve at any time. The hand operators need not be removed and the electrical control station can be located wherever desired. If desired, the shaft 84 may be extended along the gas main, so as to permit operation from a point some distance away, either motor or manually.

In the modification of Figures 6 and 7, the frame part 18' is provided with an integral cross strap 165 and the bearing 166 for the shaft 167, which may take the place of either the shaft 84 or 95 or both of Figures 1 to 4, is removably secured at 168 to this cross strap 165. The removability of this bearing 166 permits ready removal of the manual operator shaft 167 and replacement by a motor or power operator unit, which may be fastened to the strap 165 in place of the bearing 166. The power unit may be backed between the pinion 94', for example, and the hub 99' and a hand operator may be provided outside the gear case for the power unit, so that in case of failure of the power unit, the hand operator will be available at all times. This bearing structure 166 also lends itself to a bevel gear or angular operating connection to the shaft 167, as shown in Figures 8 and 9. In these Figures, the bearing 166', which corresponds with the bearing 166 of Figures 6 and 7, is enlarged at 170 and forms a housing for a bevel gear 171, fixed upon the shaft 167' and for a bevel pinion 172 fixed upon the shaft 173, from which shaft the actuating effort is imparted to the shaft 167'. The housing 170 also forms at 175 a bearing or support for the shaft 173.

The gear ratio between the pinion 83 and the gear 80 provides a relatively large reduction from the shaft 84 to the driving screw units, which imposes great power or pressure with little effort, in addition to the powerful pressure increase obtained through the differential screws, themselves. When the shaft 84 is turned, it turns the driving screw 42 at a slower speed and with great force and the chain connection 76 turns the other two driven screw shafts 42 as a unit therewith, the differential screws providing a relatively slight, but very powerful, movement and longitudinal pressure upon the frames 6. Obviously, by manipulating the chain 88, the shaft 84 may be turned or rotated, and this rotation or turning of the shaft 84 is transmitted through the pinion 83 and gear 80, through the driving screw or driving jack shaft 42 and this driving screw turns or rotates the several driven screws 42 through the endless chain 76. The screws 42 and nuts 50 and 52 provide simple mechanical contrivances for obtaining a great power increase, which is further increased by the ratio pinion 83 and gear 80. At the same time, the speed and movement of the applied or imparted effort is reduced and the pipe ends or collars 11 are moved closer together or farther apart and the lips 16 may be pressed very tightly against the opposite faces of the valve plate 5, to seal the pipe sections adjacent the valve, by the expenditure of very little effort on the part of the operator or motor, where a motor operator is employed.

For turning or swinging the valve plate 5 from one position to another, about the pivoting dowel pin 10 therefor, its margin 93 is rounded about the axis of the pivot pin 10 and is toothed, as shown. The toothed margin 93 of the valve plate 5 meshes with a relatively small pinion 94 fixed upon a valve plate operating shaft 95 in axial alignment with the shaft 84. The shaft 95 is journalled in the adjacent beam portion 18 of the adjacent frame 6, similar to the journalling of the shaft 84, so that these frames may be identical, with the shaft 84 journalled in one and the shaft 95 journalled in the corresponding portion of the other and in axial alignment therewith. This makes for uniformity and, the frames being similar, selection in assembly is avoided. The pinion 94 is fixed upon the shaft 95 to turn therewith and fixed upon the opposite end of the shaft 95 is a chain wheel or sprocket 96, similar to the wheel 87. The wheel 96 is provided with a crane or other suitable chain 97, which chain 97 is trained over the wheel 96 and looped down in the manner of the chain 88, to be conveniently accessible to the attendant. The shaft 95 may be manual or motor operated and may be operated from a remote point, as described in connection with the shaft 84, and the opposite sides of the chain 97 are guided by guide arms 98, radiating from a hub 99, mounted upon the shaft 95 between the frame 6 and the wheel 96. The shaft 95 may have bushings 100 in the frame 6, in the manner of the shaft 84.

For expediency in construction, the toothed margin 93 of the valve plate 5 is made up in arcuate sections 102, as shown in Figure 1, and these sections are suitably secured to the rounded margin of the plate 5 at 103, as by welding, riveting, or otherwise as desired. Each section may be in the form of a relatively flat, rounded plate and the margin of each section is toothed at 93, these toothed margins supplementing each other when attached to the periphery of the plate 5 and forming a continuous toothed margin about the axis of the pivot pin 10.

In use, the annular lips 16 normally bear tightly against the opposite faces of the valve plates 5, when the valve is closed and the pressure on, and to adjust or operate the valve from one position to the other, the relatively great pressure of the pipe ends or collars 11 upon the opposite faces of the valve plate 5 is relaxed by manipulating the chain 88 or otherwise operating the shaft 84 and then by manipulation of the chain 97 or operation of the shaft 95, the valve 5 may be swung from one position to the other. Then, by manipulation of the chain 88 in the opposite direction, the pressure may be restored to tighten and press the pipe ends firmly and with great pressure against the opposite faces of the valve plate 5.

As illustrative of a commercially practical embodiment of the invention, the differential screws or jacks 40 are in substantially the proportions shown, adapted for exerting a pressure in either direction of twelve thousand pounds per lineal foot of pipe circumference, but this may vary widely within the scope of the present invention.

The opposing or adjacent ends of each pair of nuts 50 and 52 are provided with coaxial recesses 110 and 112, respectively, and the opposite ends of the sleeves 46 fit telescopically, and preferably snugly, into these recesses with the nuts having sliding movement upon the ends of the sleeves 46, suitable clearance spaces 114 being provided to permit rectilinear movement of the nuts 50 and 52, relative to the sleeves 46. The opposite end of each nut 50 and 52 is internally threaded at 115 and an enclosing tube or sleeve 116 is threaded into the threaded end 115 of each nut. The opposite or outer end of each sleeve 116 may be provided with a closure cap 118, which may be threaded upon the sleeves 116 and 119. It will thus be apparent that each screw 42 is thereby entirely enclosed and the enclosure for each of these screw shafts 42 may be filled with grease or other lubricant, so that each shaft will be well lubricated and protected from corrosion, dirt, and other foreign elements. For introduction of the lubricant, each shaft 118 may be provided with an "Alemite" or other suitable fitting 120.

I do not intend to be limited to the precise details shown or described.

I claim:

1. In combination, a valve frame having a central ring portion and integral tangential extensions converging and uniting at their outer ends and forming with said ring portions beams for uniformly distributing the pressure applied to said frame, forks at the outer ends of said beams, a differential driving jack unit disposed in one of said forks, differential driven jack units disposed in the other forks, and a connecting element trained about and connecting said driving and driven jack units.

2. In combination, a valve frame having a central ring portion and integral tangential extensions converging and uniting at their outer ends and forming with said ring portions beams for uniformly distributing the pressure applied to said frame, forks at the outer ends of said beams, a differential driving jack unit disposed in one of said forks, a differential driven jack units disposed in the other forks, a connecting element trained about and connecting said driving and driven shaft units, and an operator shaft journalled in one of said frames and having ratio gear connection with said driving jacks.

3. In combination, a pair of valve frames, each having a central ring portion and integral tangential extensions converging and uniting at their outer ends and forming with said ring portions beams for uniformly distributing the pressure applied to said frame, forks disposed in pairs at the outer ends of said beams, a differential driving jack unit disposed in one pair of said forks, differential driven jack units disposed in the other pairs of said forks, a valve member, a connecting element trained about and connecting said driving and driven jack units, an operator shaft journalled in one of said frames and having ratio gear connection with said driving jack and an operator shaft journalled in the other frame and connected to said valve member between said frames.

4. In combination, a pair of valve frames, each having a central ring portion and integral tangential extensions converging and uniting at their outer ends and forming with said ring portions beams for uniformly distributing the pressure applied to said frame, forks disposed in pairs at the outer ends of said beams, differential driving jack units disposed in one pair of said forks, differential driven jack units disposed in the other pairs of said forks, a valve member, a connecting element trained about and connecting said driving and driven jack units, an operator shaft journalled in one of said frames and having ratio gear connection with said driving jack, an operator shaft journalled in the other frame and connected to said valve member between said frames, and dowel pins cooperating with radial extensions on the adjacent ends of said frames for maintaining said frames in alignment and permitting longitudinal movement, said valve member being pivoted upon one of said pins.

5. In combination, a pair of pipe ends, a pair of valve frames, one attached to each of said pipe ends and having a central ring portion and tangential beam extensions for uniformly distributing the pressure applied to said frames, forks, said jack units including a flanged nut received within said forks, the flanges of the nut embracing the sides of the forks at the apices of said beam extensions, differential frame operating jack units mounted in said forks, and means for adjusting said jack units radially in said forks.

6. In combination, a pair of pipe ends, a pair of valve frames, one attached to each of said pipe ends and having a central ring portion and tangential beam extensions for uniformly distributing the pressure applied to said frames, slotted forks at the apices of said beam extensions, differential frame operating jack units mounted in said forks, means for adjusting said jack units radially in said forks, and means for securing said jack units in adjusted position, said means being movable with said jack units and passing through the slots in the forks.

7. In combination, a valve frame having converging beam extensions, open forks at the apices of said extensions, differential screw units mounted in said forks and including sheave members turning with and turning said screw units, a connecting element trained about said sheave members, means for adjusting said differential screws in said forks to adjust the position of said sheave members for the purpose of increasing or decreasing the slack in said connecting element, said jack units including flanged nuts received within said forks, the flanges of the nuts embracing the sides of the forks, and means operable at will to secure the nuts to the forks, there being apertures in the flanges of the nuts and slots in the forks to receive said last mentioned means.

8. In combination, a valve frame having converging beam extensions, open forks at the apices of said extensions, differential screw units mounted in said open forks and including sheave members turning with and turning said screws, nuts on said screws and engaging said beam extensions, for moving said frames rectilinearly by rotation of said screws, a connecting element trained about said sheave members, means for adjusting said differential screws in said forks to adjust the positions of said sheave members for the purpose of increasing or decreasing the slack in said connecting element, means cooperating with said nuts for securing said screws in adjusted position, said adjusting means comprising adjusting screws in the valve frames and the sheave securing means comprising bolts passing through flanges on said nut members and through radially elongated openings in said valve frames.

9. In combination, a main having an internal bore and including a pair of pipe ends, a pair of valve frames each having a central ring portion with tangential beam extensions converging and uniting at their outer ends, the ring portions of said frames having openings in alignment with each other and with the internal bore of the main and the beam formation of said frames permitting full main bore diameters of said frame openings, said ring portions being of channel section with flanges at their outer ends for attachment to the pipe ends, flanges disposed in close proximity at the adjacent ends of said ring portions, and dowel pins cooperating with said adjacent flanges for maintaining said frames in alignment and permitting longitudinal movement, the close proximity of said adjacent flanges permitting said dowel pins to be relatively short and free of distortion or deflection.

10. In combination, a main having an internal bore and including a pair of pipe ends, a pair of valve frames each having a central ring portion with tangential beam extensions converging and uniting at their outer ends, the ring portions of said frames having openings in alignment with each other and with the internal bore of the main and the beam formation of said frames permitting full main bore diameters of said frame openings, said ring portions being of channel section with flanges at their outer ends for attachment to the pipe ends, flanges disposed in close proximity at the adjacent ends of said ring portions, dowel pins cooperating with said adjacent flanges for maintaining said frames in alignment and permitting longitudinal movement, the close proximity of said adjacent flanges permitting said dowel pins to be relatively short and free of distortion or deflection, and a valve pivoted on one of said dowel pins and disposed between said frames.

11. In combination, a pair of pipe ends, a pair of frame members, one attached to each of said pipe ends, dowel means connecting said frame members for maintaining alignment and permitting longitudinal movement thereof, said dowel means comprising a pair of diametrically opposite relatively heavy short dowel pins, a valve member disposed between said frame members and pivoted on one of said pins, said dowel pins each having one end fixed in one of said frames and its opposite end slidable in the other frame, and lubricant ducts in said pins for the slidable bearings of said pins in one frame and for the pivoting of the valve plate upon one pin.

In witness whereof, I hereunto subscribe my name this 7th day of January, 1929.

CARL J. WESTLING.

CERTIFICATE OF CORRECTION.

Patent No. 1,842,056.                                               Granted January 19, 1932, to

CARL J. WESTLING.

It is hereby certified that error appears in the printed specification of the above numbered patent requiring correction as follows: Page 6, line 72, claim 4, for the misspelled word "jouralled" read journalled, and line 87, claim 5, beginning with the word "said" second occurrence, strike out all to and including "forks" in line 89, and line 93, of same claim, after the word "forks" insert a comma and the words said jack units including a flanged nut received within said forks, the flanges of the nut embracing the sides of the forks; and that the said Letters Patent should be read with these corrections therein that the same may conform to the record of the case in the Patent Office.

Signed and sealed this 29th day of March, A. D. 1932.

(Seal)                                                                    M. J. Moore,
Acting Commissioner of Patents.